March 3, 1953  J. P. JOHANSEN  2,630,097
FARROWING PEN
Filed Feb. 28, 1951  2 SHEETS—SHEET 1
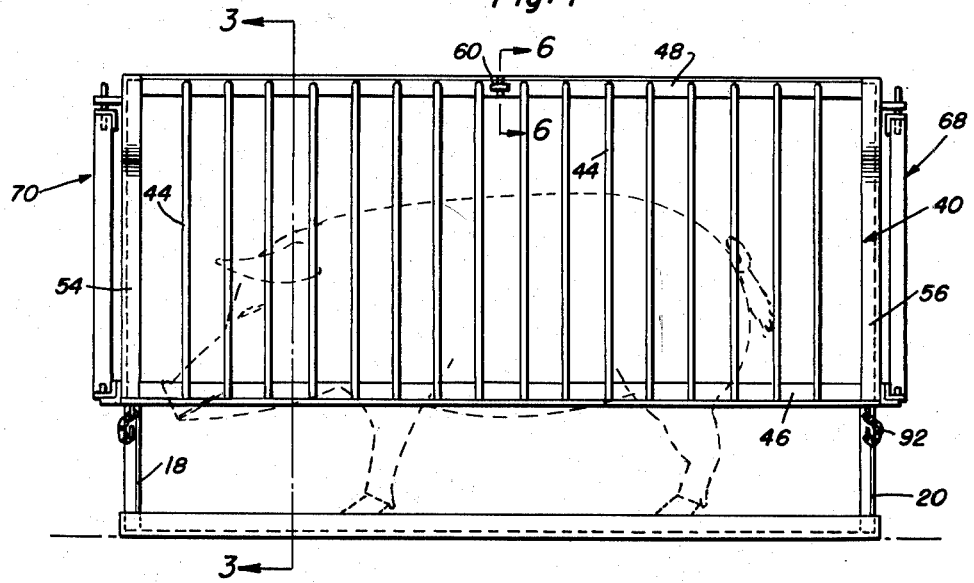
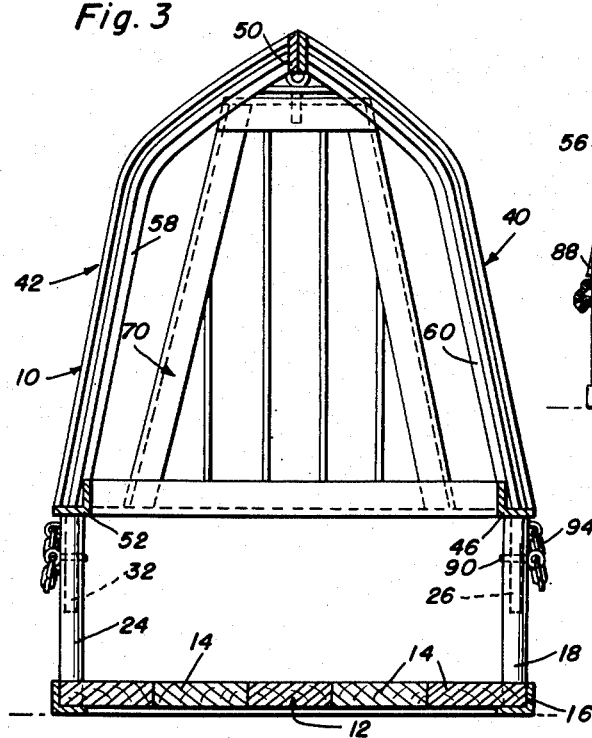
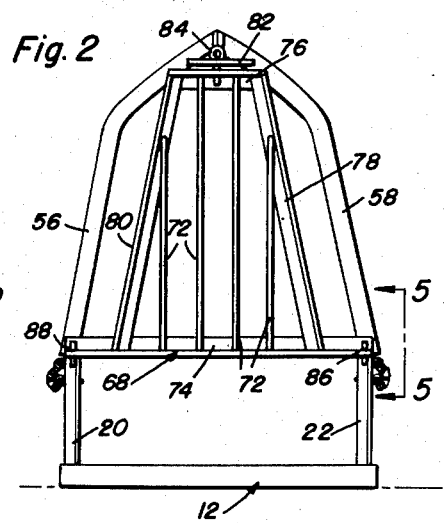
Johannes P. Johansen
INVENTOR.

March 3, 1953   J. P. JOHANSEN   2,630,097
FARROWING PEN

Filed Feb. 28, 1951   2 SHEETS—SHEET 2

Johannes P. Johansen
INVENTOR.

BY *Clarence A. O'Brien*
*and Harvey B. Jacobson*
Attorneys

Patented Mar. 3, 1953

2,630,097

UNITED STATES PATENT OFFICE 2,630,097

FARROWING PEN

Johannes P. Johansen, Hampton, Iowa, assignor of one-half to Selmar L. Johansen, Dumont, Iowa Application February 28, 1951, Serial No. 213,168

3 Claims. (Cl. 119—19)

This invention relates to improvements in animal husbandry devices.

An object of this invention is to provide an improved pen for a sow or gilt prior to giving birth to pigs, the pen including a base which is preferably rectangular in form and which has upwardly opening vertical tubes adjacent to or at the corners thereof, the vertical tubes accommodating shanks which are fixed to the lower ends of side sections of a frame, the side sections being connected together at their upper ends whereby the sections may be easily assmbled and disassembled, the pen also including end members which are fastened to the side sections, at least one and preferably both of the end members being readily detachable whereby the device may be fully disassembled.

A further object of this invention is to provide a pen as described above which has the sides and ends vertically spaced from the base an ample amount to permit the withdrawal of the small pigs.

A still further object of this invention is to provide a means in the support for the side sections which retains the side sections in a definite, but adjustable, fixed position with respect to the base.

Other objects and features of importance will become apparent in following the description of the illustrated form of the invention.

In the drawings:

Figure 1 is a side view of the device in the assembled position;

Figure 2 is an end view of the device in Figure 1;

Figure 3 is a sectional view taken on the line 3—3 of Figure 1, this view being shown in enlarged scale;

Figure 4:
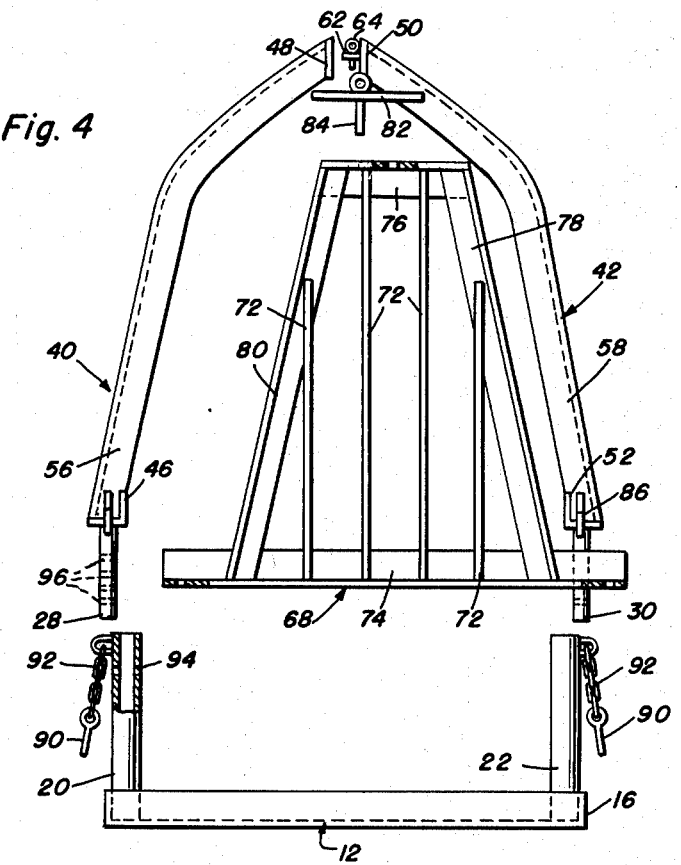
Figure 4 is an exploded elevational view of the device, portions being shown in section.
Figure 5:
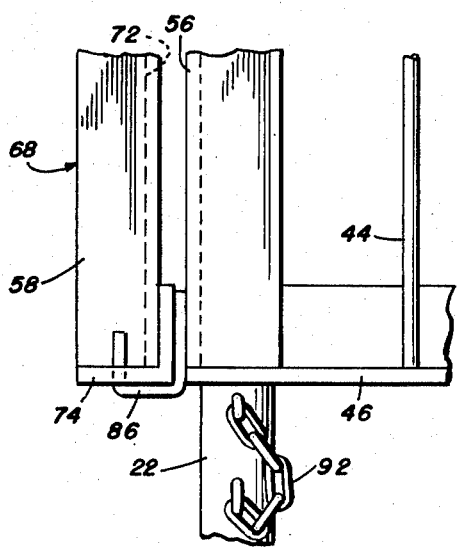
Figure 5 is an enlarged fragmentary elevational detail of construction taken on the line 5—5 of Figure 2.
Figure 6:
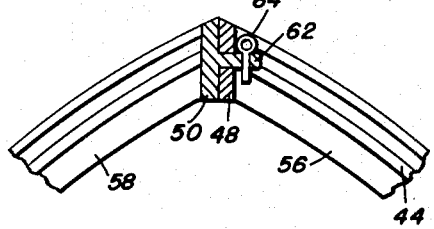
Figure 6 is an enlarged sectional view taken on the line 6—6 of Figure 1 and showing the means of attaching the top ends or edges of the side panels together.

In the illustrated device I have disclosed a pen 10 which includes a base 12, the base being formed of wood planks 14 which are disposed on the inwardly extending flanges of a rectangular frame 16. Welded to or otherwise rigidly fixed to the rectangular frame 16 at the corners thereof, are a plurality of upwardly opening vertically disposed tubular supports 18, 20, 22 and 24. These supports accommodate shanks 26, 28, 30 and 32 respectively. The shanks 28 and 32 are located at the bottom edge of a frame side section 40, while the other two shanks are located at the lower edge of a frame side section 42. As disclosed in Figure 4, the frame side section 40 is almost identical to the frame side section 42, each including a plurality of bars 44 fastened at their ends to upper and lower rails 46 and 48 respectively of the frame 40 while the remainder of the bars are fastened to the upper and lower rails 50 and 52 respectively of the frame side section 42. Front and rear angle members 54 and 56 are fastened to the upper and lower rails 46 and 48, while angle members 58 and 60 are fastened to the upper and lower rails 50 and 52 of the frame side section 42.

The upper rail 48 is provided with a slot 60 into which the tongue 62 which is fastened to the rail 50 is adapted to pass. A pin 64 is arranged to be inserted in a hole supplied in the tongue 62 thereby holding the side sections 40 and 42 fastened together at the top edges thereof.

Ends or end panels 68 and 70 respectively are releasably attached to the ends of the side sections 40 and 42. The end panel 68 includes a number of bars 72 which are fastened to a bottom angle member 74 and a top angle member 76. Side angle members 78 and 80 are also fastened to the bottom angle 74 and the top angle member 76 thereby providing a panel construction. A fastening plate 82 is welded or otherwise rigidly fixed to the end member 58 of one of the side sections and has an aperture therein to accommodate the pin 84, this pin also passing through an opening in one flange of the top angle member 76 in order to hold the panel 68 releasably fastened in place. The lower ends of the bottom member 74 have apertures in the horizontal flanges thereof, which apertures receive hooks 86 and 88 for the purpose of releasably fastening the lower ends of the panel 68 to the side sections. The hooks are so constructed that they constitute seats for the bottom angle members 74.

By having the shanks depend from the lower edges of the side sections and disposed in the upwardly opening tubular supports, the pins 90 which are attached to chains 92, may be inserted in the aligned openings 94 provided in the tubular supports so that they may pass through one of a plurality of passages 96 in each shank. Accordingly, since there is one hook provided for each vertical support, the various shanks may be held at any selected elevation with respect to the base 12 to thereby increase or decrease the vertical distance between the lower edges of the side sections and the base. With this opening provided injury to small pigs will be prevented inasmuch as they can easily be removed.

As described, the panel 68 is releasably fastened to the side sections 40 and 42. The same type of means employed for holding the end panel 69 fastened in place is used to hold the end panel 70 fastened in place on the side sections.

Having described the invention, what is claimed as new is:

1. In a pen, a base which has vertical supports carried thereby, side sections with means at the lower ends thereof adjustably and removably fastened to said supports adjustably and releasably connecting said side sections to said supports, a latch device connecting the upper ends of said side sections together in abutting relation so that the side sections may be separated from each other, end panels, and means carried by said side sections releasably supporting said end panels.

2. The combination of claim 1 and said supports holding said side sections vertically spaced from said base so as to provide a clearance between the lower ends of said sections, end panels and base.

3. A discerptible farrowing pen comprising a rectangular base, vertical tubular supports mounted at the corners of said base, a pair of side frames adjustably mounted on said supports, rods depending vertically from the lower corners of said side frames and being telescopingly received in said tubular supports, said supports and said rods having a plurality of aligned apertures, means extending through a selected pair of aligned apertures adjustably securing said side frames to said supports, the upper edges of said side frames detachably secured together in abutting relation and end walls detachably secured to the ends of said side frames whereby the pen may be dismantled for transportation.

JOHANNES P. JOHANSEN.

REFERENCES CITED

The following references are of record in the file of this patent:

UNITED STATES PATENTS

| Number | Name | Date |
| --- | --- | --- |
| 268,018 | Hicks | Nov. 28, 1882 |
| 1,283,712 | Ferris | Nov. 5, 1918 |
| 1,381,892 | Bute | June 14, 1921 |
| 2,546,536 | Berg | Mar. 27, 1951 |